3,583,933
MANUFACTURE OF AMINOPLAST RESIN-MODIFIED STARCH PASTE

Mitsuo Tanaka, Sakai-shi, Osaka-fu, and Kazuyoshi Yagyu, Osaka-shi, Japan, assignors to Arakawa Rinsan Kagaku Kogyo Kabushiki Kaisha, Osaka-shi, Japan
No Drawing. Filed Aug. 19, 1968, Ser. No. 753,776
Claims priority, application Japan, Aug. 23, 1967, 42/54,144
Int. Cl. C08g 37/32; D21h 1/10
U.S. Cl. 260—17.3
10 Claims

ABSTRACT OF THE DISCLOSURE

A process for manufacturing aminoplast resin-modified starch paste, which comprises homogeneously mixing starch, an amino compound and formaldehyde in the presence of water under a pH of 4 to 7 at 15 to 95° C. for 0.5 to 3 hours, adding alkali to the system to turn the pH thereof to 8.0 to 10.0, and then heating the system at 50 to 90° C. to effect the condensation reaction of the starch, amino compound and formaldehyde.

---

This invention relates to an improved process of the manufacture of starch paste modified with aminoplast resins.

Starch paste has been widely used in the adhesion and processing of paper and textile products. However, its water-resistance is poor and this drawback makes it difficult to use the starch paste for the uses requiring water resistant property, for example, binder for pigment paper coating.

Attempts have been made to impart water-resistant property to starch paste by adding thereto amino compounds such as urea, melamine, etc. and formaldehyde and reacting them under alkaline conditions to produce aminoplast resins. By this method water-resistance of starch paste is improved to a certain extent, but the storage stability and transparency are rather impaired, and generally, after one month's storage undesirable precipitation will occur due to aminoplast resin being separated from starch, and turning it turbid. The starch paste in which the aminoplast resin has been separated will form a coating which is poor in water-resistance and in adhesive strength to the surface treated. Further, the modication of starch paste in such a way will little accelerate its hardening and once the aminoplast resin is separated, the hardening will rather be delayed and efficiency of work will be lowered. Aminoplast resin-modified starch paste prepared as above is generally used as a binder in pigment paper coating, but it has to be used promptly after preparation for its poor storage stability, limiting the field of application.

With remarkable development of the art of pigment paper coating in recent years, it is strongly required that the starch paste of this kind has a prolonged storage stability and quick hardening property as well as that it produces water-resistant, transparent and strongly adhered coatings on the treated surfaces. And further it is also required that, depending on the coating apparatus used, the paste of this kind has a concentration of as high as more than 40 weight percent solids with low viscosity. However, there has been proposed no aminoplast resin-modified starch paste having such excellent features.

The main object of the invention is to provide aminoplast resin modified starch paste fully meeting such requirements.

An object of the invention is to provide aminoplast resin-modified starch paste which is stable in storage and transportation without causing the separation and precipitation of aminoplast resin for a prolonged period of time.

Another object of the invention is to provide aminoplast resin-modified starch paste which can produce water-resistant, transparent and strongly adhered coatings on the treated surfaces.

A further object of the invention is to provide aminoplast resin-modified starch paste which retains low viscosity even at a high solid concentration of more than 40 weight percent without causing marked increase of the viscosity.

Still another object of the invention is to provide an improved process for preparing the aminoplast resin-modified starch paste having the above mentioned properties.

These and other objects of the invention which will be apparent from the following description are accomplished by homogeneously mixing starch, an amino compound and formaldehyde in the presence of water at a pH of 4 to 7 at a temperature of from 15 to 95° C. for 0.5 to 3 hours, adding an alkali to the system to turn the pH thereof to 8.0 to 10.0, and then heating the system at 50 to 90° C. to effect condensation reaction of the starch, amino compound and formaldehyde.

According to the invention, prior to the condensation reaction of starch, amino compound and formaldehyde under an alkaline condition, it is essential to homogeneously mix the above three components in an acidic or neutral condition for 0.5 to 3 hours, and said preliminary treatment makes it possible to obtain the desired starch paste of the invention which is so stable that the separation and precipitation of aminoplast resin from starch is prevented for a long period of time. The starch paste obtained according to the invention produces coatings excellent in water-resistance, highly adhered on the treated surfaces, and can be advantageously used as adhesives for paper and textiles and as binders for pigment paper coating. The mechanism for the production of such excellent modified starch paste by the invention is not clear yet, but it may be considered that by homogeneous mixing of starch, amino compound and formaldehyde in acidic or neutral condition for a certain period, not only the three components are physically adsorbed but also by partial chemical reaction the three components are all activated to allow effective condensation reaction under alkaline conditions. Reactions which occur in said preliminary treatment process, will be, for example, the formation of methylol, methylene, ether, formal and urethane groups.

The starch used in the invention includes oxidized starch, enzyme-converted starch, hydrolyzed starch, etc.

The amino compounds such as those conventionally employed in the manufacture of aminoplast resins can be used in the invention, desirable being urea, ethyleneurea, melamine, etc. The formaldehyde can be usually used in the form of an aqueous solution, and paraformaldehyde can be also used with the same results.

According to the invention it is necessary to conduct the preliminary treatment of homogeneous mixing of starch, amino compound and formaldehyde in the presence of water under acidic or neutral conditions. In this process starch is generally used in the form of an aqueous solution or suspension and a concentration thereof may be selected from a wide range in accordance with the concentration of the desired starch paste, but usually a concentration of 10 to 70 weight percent is desirable.

The amino compound may be used in the range of 5 to 60 weight percent, preferably 8 to 40 weight percent, based on the weight of the starch used. In the preferred examples it may be used in such a proportion as to produce 10 to 100 weight percent of aminoplast resin, based on the weight of the starting starch used. The formaldehyde may be used in an amount conventional in the manufacture of aminoplast resins and the suitable amount varies in accordance with the kinds of the amino compound used. Usually it is desirable to use formaldehyde in 2 to 4 moles per mole of urea or ethyleneurea and in 3 to 6 moles per mole of melamine.

The starch, amino compound and formaldehyde may be charged in any order. For example, these three materials may be added together at the beginning and mixed homogeneously, or the amino compound may be first added with stirring to an aqueous suspension of starch and then the formaldehyde may be added and further mixed homogeneously, or even the amino compound and formaldehyde can be added to gelatinized starch with homogeneous mixing.

In whichever method as above homogeneous mixing should be necessarily performed in acidic to neutral conditions of pH 4 to 7 for 0.5 to 3 hours. For controlling pH, if necessary, pH adjuster may be added in accordance with the kinds of the starch used. In this treatment a temperature of 15 to 95° C. is preferable, particularly 75 to 95° C. being desirable. By said homogeneous mixing in acidic or neutral conditions, starch, amino compound and formaldehyde are closely and physically adsorbed and chemically reacted as aforementioned. Said preliminary treatment process should be continued for 0.5 to 3 hours, whereby the starch, amino compound and formaldehyde are effectively activated.

According to the invention, after the preliminary treatment the reaction system is turned into alkaline conditions, and borax, caustic soda, caustic potash and other alkali can be used to turn the system to pH 8.0 to 10.0, desirably 8.5 to 9.5. The system thus turned alkaline is heated to 50 to 95° C., whereupon the starch, amino compound and formaldehyde undergo condensation reaction which easily and readily takes place by virtue of the preliminary treatment in which said three components have been activated, and the starch is desirably condensed with aminoplast resin, whereby the starch paste of the invention can be obtained, which will not result in the separation and precipitation of aminoplast resin from the resultant starch paste after prolonged storage. Said condensation reaction is normally completed in about 1 to 10 hours.

To improve the viscosity stability of the present paste having a solid concentration of as high as more than 40 weight percent, it may be desirable to modify the above mentioned process of the invention. For such purpose, in the preliminary treatment of the invention a part of the necessary amount of the formaldehyde is added to an aqueous suspension or solution of the starch in combination with the amino compound, and after homogeneous mixing the rest of the formaldehyde is added to the mixture and subjected to the subsequent condensation reaction in the alkaline conditions. In this method 5 to 50 weight percent of the total amount of the necessary formaldehyde is used in the preliminary treatment and the rest of the formaldehyde is further added after homogeneous mixing. By this method there can be obtained starch paste of a solid concentration of 40 to 70 weight percent and having low viscosity and excellent viscosity stability. It is desirable in this method to use as the amino compound urea or ethylene urea.

The condensation reaction in alkaline conditions may be terminated by neutralization of the reaction system and stopping the heating. To neutralize the system there may be added various acidic substances, such as acetic acid, hydrochloric acid and guanidine salts, e.g., guanidine hydrochloride, guanidine sulfate, guanidine phosphate guanidine nitrate, guanidine carbonate.

Of these acidic substances the guanidine salts may be preferable, because by the addition thereof the viscosity stability of the resultant modified paste is markedly improved. For this purpose the guanidine salts may be used in the range of 1 to 7 weight percent, based on the weight of the solids contained in the resultant starch paste.

The thus modified starch paste of the invention can be advantageously used as a binder for pigment paper coating as well as an adhesive of paper and textiles, and when it is used in combination with polyvinyl alcohol, polyacrylamide, casein, etc. free methylol group in the starch paste will strongly react with these substances to exhibit more excellent water-resistant properties. In using the starch paste of the invention as a binder for paper coating, for example, when it is replaced with a part of casein contained in the conventional casein-synthetic resin latex type adhesive, the amount of expensive casein can be reduced and the viscosity stability of the resultant coating color and water-resistance of the coatings are markedly improved without any adverse effect on the surface strength and gloss of the coated paper, thus improving such binders and rendering them uneconomical.

For fuller understanding of the invention examples are given below, in which all parts show weight parts, and the viscosity was measured by Brookfield viscometer at 65 r.p.m. at 25° C.

EXAMPLE 1

100 parts of potato dextrin whose viscosity in a 50 weight percent aqueous solution at 50° C. is 500 cps., 30 parts of urea were suspended in 73 parts of water. The suspension thus obtained was heated to 60° C., when 98 parts of 37 weight percent formaline was added, and adjusted to pH 6.0 with caustic soda, and homogeneously mixed with stirring at 90° C. for 1 hour with stirring.

While cooling 3.9 parts of borax was added to the homogeneous mixture and adjusted to pH 9.0 with caustic soda and the mixture was heated at 70° C. for 1.5 hours. The resultant reaction mixture was diluted with water to a solid concentration of 35 weight percent and adjusted to pH 8.0 with glacial acetic acid, whereby was obtained a urea-formaldehyde resin-modified starch paste whose viscosity at 25° C. was 600 cps.

EXAMPLE 2

100 parts of dextrin same as in Example 1, 30 parts of urea and 27 parts of 37 weight percent formaline were added to 73 parts of water, to which caustic soda was added to adjust the pH to 6.5, and homogeneously mixed at 90° C. with stirring for 1 hour.

While cooling, 3.9 parts of borax and 71 parts of 37 weight percent formaline were added to the homogeneous mixture, adjusted to pH 9.0 with caustic soda and heated at 70° C. for 4 hours.

The resultant product was diluted with water to a concentration of 40 weight percent, and adjusted to pH 8.0 with glacial acetic acid, whereby starch paste whose viscosity at 25° C. was 640 cps. was obtained.

For comparison starch paste was prepared by the following methods.

Comparison 1

(Conventional method in which no preliminary treatment was conducted.)

100 parts of dextrin same as that of Example 1 was suspended in 73 parts of water, adjusted to pH 7.0 with caustic soda and stirred at 90° C. for 0.5 hour to gelatinize the dextrin.

To the above gelatinized dextrin were added 30 parts of urea, 98 parts of 37 weight percent formalin and 3.9 parts of borax, and the mixture was adjusted to pH 9.0 with caustic soda and heated at 70° C. for 15 hours. Thus, the starch paste having a concentration of 35 weight percent and a viscosity of 630 cps. (at 25° C.) was obtained.

Comparison 2

(Preliminary treatment was performed under alkaline condition.)

Starch paste was prepared in a similar manner as in Example 1 except that the preliminary treatment was conducted at pH 8.0 and the condensation reaction in alkaline condition (pH 9.0) was performed at 70° C. for 15 hours. The resultant starch paste had a concentration of 35 weight percent and a viscosity of 690 cps. (at 25° C.).

(I) PROPERTIES OF STARCH PASTE

The properties of starch pastes of the above Examples 1 and 2 and Comparisons 1 and 2 are shown in Table 1 below, in which transparency, hardening time and storage stability were measured by the following methods:

(a) Transparency.—Photo-extinction of the starch paste immediately after preparation was compared to that of distilled water, and the value shown in Table 1 was the value when the photo-extinction of the distilled water was 100, so the larger the value shown the higher is transparency.

(b) Hardening time.—The starch paste of a concentration of 35 weight percent was heated at 50° C. and pH 4.0, and the time required to gel was measured.

(c) Storage stability.—The starch paste was left standing at room temperature for the period shown in Table 1 below, and the degree of the precipitation (ppt.) was observed with the naked eye.

TABLE 1

| Starch paste | Transparency (percent) | Hardening time (hrs.) | Storage stability (ppt.) after— | | |
|---|---|---|---|---|---|
| | | | One week | One month | Three months |
| Ex. 1 | 98.9 | 2.5 | None | None | None. |
| Ex. 2 | 88.9 | 3.0 | ...do | ...do | Do. |
| Comp. 1 | 25.2 | 5.0 | Slight | 30% | 60%. |
| Comp. 2 | 46.4 | 4.5 | ...do | 25% | 50%. |

(II) BINDER FOR PAPER COATING

Three kinds of coating color prepared from the following components:

Coating color-A (Hereinafter referred to as "Color-A")

| | Parts |
|---|---|
| Clay | 90 |
| Satin white | 10 |
| Casein | 6 |
| Starch paste of Example 1 (solid) | 2 |
| Styrene-butadine copolymer latex (solid) | 8 |
| Sodium pyro-phosphate | 0.3 |
| Defoamer | 1 |
| Water | 90 |
| Aqueous solution of sodium hydroxide | (¹) |

¹ Necessary amount to give a paint of a pH 11.5 and a solid concentration of 54 weight percent.

Coating color-B (Hereinafter referred to as "Color-B")

The same components as Color-A above except that the starch paste of Example 2 was used in the place of the starch paste of Example 1.

Coating color-C (Hereinafter referred to as "Color-C")

The same components as Color-A above except that 8 parts of casein was used without using the starch paste of Example 1.

The respective coating color coated with a blade coater to the wire-side of fine quality paper at the rate of 10 g./m.² (in dryness), and it was calendered to produce coated paper. The resultant coated paper was left in a room maintained at 20° C. and 65% RH for 10 days for aging, after which the properties of the coated paper thus obtained were measured by the following conditions:

(a) Surface strength of paper was measured according to I.G.T. Pick Test (Tappi Standard Method T 499 Su-64) under the following conditions:

Spring tension—B
Ink—I.P.I tack grade ink No. 3
Printing—Machine direction (b) Water-resistance was measured according to Adam's Wet Rub Test, and the weight of the coating color dissolved at total load of 1.04 kg. for 30 seconds of wet fraction was measured and water-resistance was sought by the following equation, so the smaller the value higher is the water-resistance:

$$\text{Water-resistance} = \frac{\text{weight dissolved}}{\text{weight coated}} \times 100$$

(c) Gloss: Hunter's multipurpose reflectometer was used as gloss meter. (Specular gloss at 75°.)

The results of the above tests are shown in Table 2 below:

TABLE 2

| Coating color | Surface strength (cm./sec.) | Water-resistance (percent) | Gloss (percent) |
|---|---|---|---|
| Color-A | 141 | 0.43 | 46 |
| Color-B | 134 | 0.34 | 47 |
| Color-C | 134 | 0.96 | 43 |

EXAMPLE 3

100 parts of corn dextrin whose viscosity in 50 weight percent aqueous solution at 50° C. was 3,000 cps. was suspended in 73 parts of water and then heated at 90° C. for 30 min. to gelatinize. To the above solution were added 30 parts of urea and 98 parts of 37 weight percent formalin and adjusted to pH 6.0 with caustic soda, and homogeneously mixed with stirring at 90° C. for 1.5 hours.

From the resultant homogeneous mixture, starch paste of 35 weight percent solid concentration, pH 8.0 and 580 cps. viscosity at 25° C. was obtained in the same manner as in Example 1.

EXAMPLE 4

Starch paste was prepared in a similar manner to Example 1 except that 30 parts of ethyleneurea was used in the place of 30 parts of urea, and the condensation reaction in alkaline condition (pH 9.0) was carried out at 70° C. for 5 hours. Thus, starch paste of 35 weight percent solid concentration, pH 8.0 and 580 cps. viscosity at 25° C. was obtained.

EXAMPLE 5

100 parts of dextrin same as that of Example 1 and 30 parts of melamine were suspended in 98 parts of water. The suspension was heated to 60° C., then 135 parts of 37 weight percent formalin was added and adjusted to pH 7.0 with caustic soda, and further heated at 90° C. at which temperature it was homogeneously mixed with stirring for 1 hour. From the resultant homogeneous mixture, starch paste of 30 weight percent solid concentration, pH 8.0 and 650 cps. viscosity was obtained in the same manner as in Example 1.

The properties of the pastes of Examples 3, 4 and 5 measured by the same methods as in Table 1 were shown in Table 3 below:

TABLE 3

| Starch paste | Transparency (percent) | Hardening time (hours) | Storage stability, after— | | |
|---|---|---|---|---|---|
| | | | 1 week | 1 month | 3 months |
| Example: | | | | | |
| 3 | 83.5 | 3.0 | Ppt. none | Ppt. none | Ppt. none. |
| 4 | 99.1 | 3.5 | do | do | Do. |
| 5 | 98.8 | 0.5 | do | do | Do. |

EXAMPLE 6

100 parts of dextrin same as that used in Example 3, 8.8 parts of urea and 12 parts of 37 weight percent formalin were suspended in 90.8 parts of water, and after adjusting pH to 6.5 with caustic soda the suspension was homogeneously mixed at 90° C. for 1 hour. While cooling, 3.9 parts of borax and 17.6 parts of 37 weight percent formalin were further added to the mixture, and then adjusted to pH 9.0 with caustic soda, and heated at 70° C. for 6 hours to effect condensation. After the reaction was completed, 6.4 parts of guanidine hydrochloride was added to the reaction mixture and diluted with water to a concentration of 40 weight percent, and pH was adjusted to pH 8.0 by addition of glacial acetic acid, whereby starch paste of viscosity of 630 cps. at 25° C. was obtained.

EXAMPLE 7

100 parts of corn dextrin whose viscosity in 50 weight percent aqueous solution at 50° C. was 300 cps., 30 parts of urea and 27 parts of 37 weight percent formalin were suspended in 29.6 parts of water, and after adjusting pH 6.5 the resultant suspension was homogeneously mixed at 90° C. for 1 hour. Then 3.9 parts of borax and 71 parts of 37 weight percent formalin were added and adjusted to pH 9.0 with caustic soda, and heated at 70° C. for 7 hours for condensation reaction.

After the completion of the reaction starch paste of 55% concentration, pH 8.0 and 730 cps. viscosity at 25° C. was obtained.

EXAMPLE 8

100 parts of dextrin same as in Example 1, 30 parts of ethyleneurea and 46 parts of 37 weight percent formalin were added to 73 parts of water, to which caustic soda was added to adjust the pH to 6.5, and homogeneously mixed at 90° C. with stirring for 1 hour.

While cooling, 3.9 parts of borax and 52 parts of 37 weight percent formalin were added to the homogeneous mixture, adjusted to pH 9.0 with caustic soda and heated at 70° C. for 5 hours.

The resultant product was diluted with water to a concentration of 40 weight percent, and adjusted to pH 8.0 with glacial acetic acid, whereby a starch paste whose viscosity at 25° C. was 624 cps. was obtained.

In the following Table 4, there are shown transparency, hardening time, storage stability and viscosity stability of the starch pastes of Examples 6 to 8.

TABLE 4

| Paste | Transparency (percent) | Hardening time (hours) | Storage stability, after— | | | Viscosity stability, after— | |
|---|---|---|---|---|---|---|---|
| | | | 1 week | 1 month | 3 months | 1 month | 3 months |
| Example: | | | | | | | |
| 6 | 88.3 | 3.5 | Ppt. none | Ppt. none | Ppt. none | 700 | 810 |
| 7 | 82.0 | 3.5 | do | do | do | 980 | 1,820 |
| 8 | 94.2 | 3.5 | do | do | do | 920 | 1,210 |

NOTE: H.T.: Hardening time which was measured for all starch pastes adjusted to solid concentration of 35 weight percent.

With using the starch pastes of Examples 3 to 8 were respectively prepared 6 kinds of coating color D to I in the same manner as in Color-A before, and the results of the test carried out in the same manner as in Table 2 are shown below:

TABLE 5

| Coating color | Surface strength of paper (cm./sec.) | Water-resistance (percent) | Gloss |
|---|---|---|---|
| Color: | | | |
| D | 141 | 0.38 | 47 |
| E | 138 | 0.60 | 44 |
| F | 141 | 0.28 | 46 |
| G | 135 | 0.65 | 47 |
| H | 134 | 0.55 | 43 |
| I | 135 | 0.72 | 43 |

What we claim is:

1. A process for manufacturing aminoplast resin-modified starch paste, which comprises homogeneously mixing starch, an amino compound in an amount of from 5 to 60% by weight based on the weight of said starch and formaldehyde in an amount of at least 2 moles per mole of amino compound in the presence of water at a pH of 4 to 7 at a temperature of from 15 to 95° C. or 0.5 to 3 hours, adding alkali to the system to turn the pH thereof to 8.0 to 10.0, and then heating the system at 50 to 90° C. to effect the condensation reaction of the starch, amino compound and formaldehyde.

2. The process for manufacturing aminoplast resin-modified starch paste according to claim 1, in which said amino compound is one member selected from the group consisting of urea, ethyleneurea and melamine.

3. The process for manufacturing aminoplast resin-modified starch paste according to claim 1, in which said amino compound is used in the range of 8 to 40 weight percent, based on the weight of the starch used.

4. The process for manufacturing aminoplast resin-modified starch paste according to claim 1, in which said amino compound is one member selected from the group consisting of urea and ethyleneurea and said formaldehyde is used in the range of 2 to 4 moles per mole of the urea or ethylene urea.

5. The process for manufacturing aminoplast resin-modified starch paste according to claim 1, in which said amino compound is melamine and said formaldehyde is used in the range of 3 to 6 moles per mole of the melamine.

6. The process for manufacturing aminoplast resin-modified starch paste, which comprises homogeneously mixing in the presence of water at a pH of 4 to 7 at a temperature of from 15 to 95° C. for 0.5 to 3 hours starch, an amino compound in an amount of from 5 to 60% by weight based on the weight of said starch and a part of formaldehyde necessary for condensation reaction with the amino compound, adding the rest of formaldehyde and alkali to the system to turn the pH thereof to 8.0 to 10.0, and then heating the system at 50 to 90° C. to effect the condensation reaction of the starch, amino compound and formaldehyde, the total amount of formaldehyde being at least 2 moles per mole of amino compound.

7. The process for manufacturing aminoplast resin-modified starch paste according to claim 6, in which said formaldehyde used for homogeneous mixing is 5 to 50 weight percent of the total amount of the necessary formaldehyde.

8. The process for manufacturing aminoplast resin-modified-starch paste according to claim 6, in which said amino compound is one member selected from the group consisting of urea and ethyleneurea.

9. The process for manufacturing aminoplast resin-modified starch paste according to claim 6, in which said amino compounds is one member selected from the group consisting of urea and ethyleneurea, and the amount of the formaldehyde used for homogeneous mixing is 5 to 50 weight percent of the total amount of the formaldehyde used in the proportion of 2 to 4 moles per mole of the urea or ethyleneurea.

10. The process according to claim 1 wherein the amount of said amino compound is at least 8.8% by weight of said starch.

References Cited
FOREIGN PATENTS

| | | | |
|---|---|---|---|
| 902,938 | 8/1962 | Great Britain | 260—17.3 |
| 7,645 | 9/1962 | Japan | 260—17.3 |

WILLIAM H. SHORT, Primary Examiner

E. WOODBERRY, Assistant Examiner

U.S. Cl. X.R.

117—155